United States Patent [19]
Hart-Smith et al.

[11] Patent Number: 5,910,348
[45] Date of Patent: Jun. 8, 1999

[54] SEPARATOR FILM

[75] Inventors: Leonard John Hart-Smith, Long Beach; Norman R. Byrd, Villa Park, both of Calif.

[73] Assignee: McDonnell Douglas Corporation, Long Beach, Calif.

[21] Appl. No.: 08/761,556

[22] Filed: Dec. 6, 1996

[51] Int. Cl.$^6$ .............................. A61F 13/02; B32B 7/12; B32B 27/00; B32B 9/00

[52] U.S. Cl. .................. 428/41.5; 428/42.2; 428/42.3; 428/40.1; 428/41.8; 428/423.1; 428/354; 428/355

[58] Field of Search .................. 428/42.3, 41.5, 428/42.2, 40.1, 41.8, 423.1, 902, 354, 355; 442/286, 293

[56] References Cited

U.S. PATENT DOCUMENTS

| | | | |
|---|---|---|---|
| 2,845,997 | 8/1958 | Waite et al. | 155/179 |
| 4,622,091 | 11/1986 | Letterman | 156/286 |
| 4,714,512 | 12/1987 | House et al. | 156/306.6 |
| 5,258,445 | 11/1993 | Sperk et al. | 524/597 |
| 5,401,344 | 3/1995 | Dickson et al. | 156/90 |
| 5,464,494 | 11/1995 | Bolte et al. | 156/330 |

*Primary Examiner*—Jose' G. Dees
*Assistant Examiner*—Alton Pryor
*Attorney, Agent, or Firm*—Stout, Uxa, Buyan & Mullins, LLP

[57] ABSTRACT

An improved separator film that can be applied to a layer of composite prepreg material as well as resin based adhesive films to prevent sticking, voids and separator film contamination in formed articles, as well as providing useful handling and storage properties. The separator film of the present invention is designed to either degrade and/or volatilize away so as not to contaminate or leave voids or weak interfaces in the resulting article. The separator film also eliminates the need to inspect the formed article for remaining separator film. In general, the separator film of the present invention is made from a polymer or combination of polymers that can volatilize away or revert into monomers or simpler polymers. This volatilization or degradation into a plurality of reversion products occurs when the separator film is exposed to sufficient heat energy. The reversion products are generally capable of reacting with the resin in the composite prepreg material or alternatively, the adhesive film, such that the separator film actually becomes part of the article being formed.

11 Claims, No Drawings

SEPARATOR FILM

FIELD OF THE INVENTION

This invention relates generally to separator films for use with composite prepreg materials and adhesive films and, more particularly, to an improved separator film for use with composite prepreg materials and adhesive films.

BACKGROUND OF THE INVENTION

In recent years, the use of high strength-to-weight ratio fiber-reinforced resin composites has continuously expanded Parts or articles made from layers or plies of these fiber-reinforced resin composites are generally created by forming a laminate or lay-up, e.g., a stacking of individual layers of the desired composite material. Each layer or ply of the composite material is typically formed from unidirectional or multidirectional woven fabrics made of glass, graphite fibers, or other fibers which are impregnated with a resin. Such pre-impregnated plies are commonly referred to as "prepreg" plies or simply prepreg. Normally the lay-up is built atop a forming or lay-up tool, which, in its simplest form, may comprise a flat working surface.

Each of the composite material layers is generally cut to a desired shape and placed on top of the previously cut layer or stack of layers to form a lay-up. Thus, the lay-up is a laminate of layers which have been stacked to form the desired three dimensional object or part. After the complete lay-up is prepared, heat and pressure are applied. The heat cures the resin and the pressure compresses the lay-up preventing air and other gases, including volatile gases, from forming porosity or bubbles in the resin as it cures. Normally, an autoclave is used to apply the necessary heat and pressure, yielding the finished article. Alternatively, the cure is accomplished under complete or partial vacuum, with heat.

This fiber/polymer composite prepreg material is generally shipped from a material supplier to a composite products manufacturer in large rolls. Each roll generally includes a plastic separator film or ply (interleaf) which is attached to the generally continuous composite layer to prevent the composite layer from sticking to itself when the material is initially rolled as well as unrolled. This same kind of separator film is used for prepreg material shipped as flat sheets, such as for boron-epoxy. Also, when the product or lay-up is being built, the separator film serves to protect the lower surface of each composite layer from contamination while being cut, formed or otherwise worked. Once each of the layers has been cut to its desired shape, or otherwise formed, the separator film is removed and the layer is transferred to the lay-up tool.

In a similar fashion, modern adhesive films are generally supplied in rolls, or alternatively in sheets A number of these modern adhesive films have a resin base that is similar to the resin used in composite prepreg materials. These adhesive films are generally tacky and require a separator ply or film to prevent self-adhesion and contamination as described above.

The prior art separator films are generally made from an inert material and applied as a very thin ply or film. These separator films are typically made from polyethylene or polypropylene, and discarded as each layer of prepreg or adhesive is laid down or otherwise applied.

A problem occurs when the separator film of the prior art is not removed or not fully removed from the composite layer to which it is attached. When this occurs, the separator film or a portion thereof ends up as an additional layer in the lay-up. Thus, the separator film is embedded within the composite lay-up as it is cured. This separator film acts as a delaminating site within the part, because the resin will not adhere to it, which will then lead to a much weaker part in addition to a part that may not have the expected or desired characteristics. A similar problem occurs when the separator film is not removed from an adhesive film layer.

An additional problem involves detecting any separator film which has been inadvertently left within a lay-up or even within a finished part. The problem of detecting such a separator film is worsened when using automatic lay-up machinery which does not have the capability to detect separator film within the lay-up.

As stated, the separator film does not bond to the resins of most composite materials or adhesive films. However, separator films adhere sufficiently well such that no gaps are created in the lay-ups or even in the cured parts. This makes subsequent detection of any separator film material inadvertently left in a lay-up difficult and unreliable.

Any separator film inadvertently left in the finished part usually results in the need to perform a structural repair of the composite part. This repair is due, in part, to the failure of the separator ply to bond to the matrix resin of most composite materials. These repairs are generally expensive and time consuming, as is the detection of remaining separator film. Further, even if the separator film did or could bond to the matrix resin, the strength and other properties of the separator film may not be adequate or suitable for the desired part. Thus, an intensive inspection as well as an expensive repair is still required.

Alternate configurations of composite prepreg materials includes a thermoplastic material applied to at least one side of each layer. The thermoplastic material and the composite prepreg material generally do not mix or otherwise react. The thermoplastic material acts to toughen the overall lay-up. However, the composite material, including the applied thermoplastic material, is still generally supplied as a roll using a separator film to keep the layers apart. Thus, the problem of the separator film inadvertently left in the lay-up remains.

An alternative method of removing separator film may include chemically decomposing the separator film, such as by a chemical treatment. This chemical decomposing could take place prior to assembly or placement of the composite layer on the lay-up. However, chemical decomposition of the separator film would require that an acidic or basic moiety be present in the separator film which in turn would facilitate the decomposition process. This is particularly true if the separator film is a polyester or polyamide, such as Mylar or nylon. Since the presently used separator film is typically a polyethylene, as mentioned above, this approach is not feasible. Decomposition of these separator films, or any other hydrocarbon or fluorocarbon film, requires strong oxidizing agents and/or very high temperatures. These techniques are not practical since the agents and/or process would adversely affect the properties of the composite layers and the lay-up. Thus, a less stringent process of film degradation and removal is needed.

Additionally, the separator ply material must be non-tacky at room temperature to prevent sticking of the separator film during the rolling up of the composite layer or layers and also during handling, as well as at lower temperatures to prevent similar problems during storage. It must also not adversely affect the primary resin matrix as it cures or afterwards.

Thus, there is a need for a separator film which, if inadvertently left on a layer of prepreg composite material will not require expensive detection analysis. There is a further need for a separator film which, if inadvertently left on a layer of prepreg composite material will not require expensive repairs to the finished part. There is also a need for a separator film which can be purposely left on a prepreg composite layer when forming a lay-up and which may actually enhance the desired properties of the finished part. There is also a need for a separator film having the above properties which can be used with alternative composite material configurations, is generally nontoxic, and inexpensive.

SUMMARY

The present invention satisfies the need for a separator film that can be applied to a layer of composite prepreg material having a resin matrix or base as well as to a layer of resin-based adhesive film to prevent sticking, voids and separator film contamination. The separator film also provides useful handling and storage properties. The separator film of the present invention is non-tacky at room temperature to prevent sticking to itself during the rolling up and other handling of the composite material or adhesive film. The separator film also remains non-tacky at lower temperatures to prevent similar problems during storage.

The separator film of the present invention is designed to either degrade and/or volatilize away so as not to contaminate or leave voids in the composite lay-up or adhesive film after curing. In general, the separator film of the present invention is made from a material or combination of materials that can degrade or revert into simpler products which can then dissolve or react with the resin matrix or base in the composite material or adhesive film. This volatilization or degradation into a plurality of reversion products occurs when the separator film is exposed to sufficient heat energy. As discussed, the reversion products are generally capable of reacting with the resin in the composite prepreg material so that the separator film actually becomes part of the article being made. Thus, the separator film of the present invention does not have the problems of the prior art separator films if not removed during the lay-up of the composite laminate part.

The present invention is generally directed to a separator film which is generally degradable at a ceiling temperature. This separator film is applied to a layer of fiber reinforced composite prepreg material or, alternatively, to a layer of resin based adhesive. Both the composite prepreg material and the layer of adhesive of the present invention have a resin matrix or base containing an epoxy, polyester, or polyamide, among others, which will have active moieties such as hydroxyl or amino groups. The separator film is applied to at least one side of the layer of resin composite material or alternatively the layer of adhesive.

The separator film provides a non-stick surface and prevents the resin in the composite material or, alternatively, in the layer of adhesive from sticking to itself or other items during packaging, shipping and handling. The separator film can then be volatilized or degraded when exposed to a sufficient heat energy, often described as a ceiling temperature. It is expected that the ceiling temperature for most separator films of the present invention will be between approximately 175 degrees fahrenheit and approximately 400 degrees fahrenheit.

In one broad aspect of the present invention, the separator film degrades into a plurality of reversion products at the ceiling temperature. Generally, at least one of the reversion products reacts with the active functional groups in the resin matrix to become part of the cured article.

In another broad aspect of the present invention, the separator film is a polymer obtained from the polymerization of a carbon-carbon double bond moiety. More particularly, an addition polymer capable of degrading into its basic components is disclosed as a separator film. In a more particular aspect, the separator film is an addition polymer selected from the group consisting of polystyrene, polyvinyl chloride and polymethacrylate.

In another aspect of the present invention, the separator film is a polyurethane and even more particularly, a polyurethane formed by adding a glycol to a diisocyanate. When this polyurethane degrades, it reverts into a glycol and a diisocyanate. This reversion or degradation typically occurs at the ceiling temperature between 200 degrees fahrenheit and 300 degrees fahrenheit. An isocyanate is made available from the reverted diisocyanate, which reacts with an amine present in the resin to become a thermally stable part of the cured article.

Methods for making composite materials having a degradable separator film applied to at least one side, for example, the presently described separator film, are included within the scope of the present invention. These methods include methods for making an article from the described plurality of layers of resin composite material having a degradable separator film applied to at least one side. In general, such methods comprise forming a first layer of the article from a ply of the composite material, placing the first layer on a working surface to form the base of a stack, applying a next layer of the article on top of the first layer. The shaping of the subsequent layers and the stacking steps are repeated until the three-dimensional article is built. Heat is then applied until the plurality of layers of resin composite material are cured together and the separator film is generally degraded or dissolved.

In one embodiment of the method, the separator film is a polyurethane made from a glycol and diisocyanate. After the lay-up is formed, heat is applied to the polyurethane at a temperature at or above a ceiling temperature to revert the polyurethane back into a glycol and a diisocyanate.

In another broad aspect of the present invention, the method comprises removing a portion of the separator film from the composite material prior to the step of stacking that cross section.

In another broad aspect of the present invention, a method for making and packaging a given length of a composite sheet prepreg material layer using a separator film to prevent the composite material from contacting itself when packaged is disclosed. The method comprises providing a given length of a composite sheet prepreg material and applying a separator film to at least one side of the prepreg material. The separator film is adapted to generally degrade into a plurality of reversion products upon the application of a sufficient heat energy. At least one of the reversion products reacts with the prepreg material to become a thermally stable part of the prepreg material. The composite material having the applied separator film is then packaged.

The invention, together with additional features and advantages thereof, may be best understood by reference to the following description.

DETAILED DESCRIPTION

Accordingly, a preferred embodiment of a resin composite material having a separator film formed in accordance with the present invention includes a layer of a fiber-reinforced resin composite material having an associated separator film. This composite material can be most any preimpregnated resin composite material but preferably contains a resin matrix or base having an amino, mercapto, carboxyl or hydroxyl group. In particular, a diaminosulfone or other amine, as is normally added to epoxy resin formulations, is preferred. However the present invention is not limited to only these types of resins.

In addition, a preferred embodiment of a resin based adhesive film includes a layer of adhesive film having a resin base and a layer of a separator film formed in accordance with the present invention. The adhesive film can be most any resin based adhesive film but preferably contains a resin having an amino, mercapto carboxyl or hydroxyl group. In particular, a diaminosulfone or other amine, as is normally added to epoxy resin formulations, is preferred. However the present invention is not limited to only these types of resins.

Typically, prepreg resin composite material as well as adhesive film is manufactured as a layer or sheet of continuous length. After application of a separator ply or film, the layer can be rolled for improved shipping and handling. During the formation of lay-ups, the rolled composite material is generally unrolled to expose the composite material as a layer. While previous separator films had to be removed, the separator film of the present invention may be removed from the layer or alternatively may be left on. As will be discussed, the separator film of the present invention may purposely be left on the resin composite material, in part or completely, to toughen the composite lay-up.

The separator film is applied to at least one side of the resin composite material to prevent sticking of the composite material to itself as well as to other items and to prevent contamination and embedded delaminations. The separator film also provides useful handling and storage properties. Alternatively, the separator film may also be applied to both sides of the composite material.

In order to overcome the problem of remaining separator film in a lay-up or article, the separator film of the present invention degrades or reverts to become an integral part of the resin composite material or adhesive film without adversely affecting the mechanical properties. In an alternative embodiment, the separator film may also volatilize, alone or in combination with the degradation. This volatilization or degradation into a plurality of reversion products occurs when the separator film is exposed to sufficient heat energy.

The reversion products are generally capable of reacting with the resin in the composite prepreg material or adhesive film so that the reverted separator film actually becomes a thermally stable part of the article being made. Thus, the separator film of the present invention does not have the problems of the prior art separator films if not removed during the lay-up of the composite laminate part.

In one embodiment of the present invention, the separator film is formed from a revertible polymer, such as a polymer obtained from the polymerization of a carbon-carbon double bond moiety. The polymer may be an addition polymer that can be reverted back to more basic polymers, monomers or other components. For example, the separator film may be made from the group consisting of polystyrene, polyvinyl chloride and polymethacrylate, each of which shares the property of being formed from the polymerization of a carbon-carbon double bond moiety.

These addition polymers have a temperature limitation, below which they polymerize and above which they depolymerize back to a generally monomeric state. This temperature, or heat energy, is called the ceiling temperature. The ceiling temperature relates to the ease with which the polymer can form an active structure through electron rearrangement. In other words, the easier it is to stabilize a radical species through resonance interactions, or applied heat energy, with a part of the polymeric structure, the easier it is to depolymerize.

For example, the phenyl group in polystyrene can readily stabilize a radical that will form from the breakdown of the polymer. Thus the ceiling temperature of polystyrene will be lower than that of a polymer which has fewer resonance stabilization sites, such as polyethylene. A lower ceiling temperature allows degradation at a lower applied heat energy with less concern about effect on the resin composite material. The separator film polymer may be selected from an addition polymer having a desired ceiling temperature.

The described addition polymers are generally non-tacky at room temperature so as to prevent sticking of the separator film to itself during the rolling up and other handling of the resin composite material. These polymers also remain non-tacky at lower temperatures to prevent similar problems during storage.

One drawback to using the addition polymers as described in conjunction with a ceiling temperature reversion process is a concern that the polymer may not completely degrade or depolymerize into a monomer or other appropriate reversion product. The polymer may actually degrade into polymeric fragments which do not volatilize and won't react with the resin but that continue to degrade over time. Since the application of heat is generally removed after a period of time, this further degradation can occur slowly, leaving polymeric fragments in the resin composite part. These fragments could cause problems as previously discussed.

In an effort to eliminate any polymeric fragments as well as to improve the overall reversion process, polyurethane may be used as a separator film. The advantage of polyurethanes is their ease of reversion at elevated temperatures.

There are a large number of starting materials which are suitable for the production of polyurethanes useable as a separator film. In very general terms, they may be divided into the so called polyol component and the so called isocyanate component. In particular, the polyurethane may be formed by adding a glycol to a diisocyanate. This reaction is relatively fast and the product is stable at room temperature. However, it is believed that any polyurethane containing an isocyanate may be used.

The polyurethane can be reverted back to the glycol and diisocyanate using elevated temperatures of between 200 degrees fahrenheit and 400 degrees fahrenheit However, the reversion generally takes place at a ceiling temperature of approximately 250 to 275 degrees fahrenheit.

Specifically, when sufficient heat energy is applied to the lay-up, adhesive film, or article, the polyurethane film degrades and reverts back to glycol and diisocyanate. Sufficient heat energy generally requires heating the separator film to a temperature at or above its ceiling temperature. Preferably, this sufficient heat energy includes the heat energy generally required to cure a typical resin composite article or to cure an adhesive film. Curing generally includes heating the article above the ceiling temperature for a sufficient time to ensure the separator film is completely degraded or reverted.

When forming an article using a composite material or adhesive film having an applied polyurethane separator film of the present invention, the separator film may be inadvertently or purposely left in the article or on the adhesive film without adversely affecting the mechanical properties of the cured article. The separator film may even be left on the composite prepreg material or adhesive film during the lay-up or other use to enhance the desired properties and increase toughness. Further, the need to inspect the article for remaining separator film is eliminated.

When the separator film of the present invention is heated to its ceiling temperature, the separator film degrades and reverts back to the original monomers. In this embodiment, the described polyurethane separator film degrades and reverts to glycol and diisocyanate. When the polyurethane separator film is in contact with the resin, the reverted components will react with components in the resin composite material to become a thermally stable part of the resin.

More specifically, when the epoxy moieties and hydroxyl groups in the resin are contacted by the reversion products from the polyurethane separator film, they react and become part of the resin. Ultimately, when the resin is fully cured, any isocyanate (diisocyanate) that results from the thermal degradation of a urethane moiety in the separator film will react with an amine present in the resin to become ureas. These ureas become a thermally stable part of the cured resin. In essence, the separator film has dissolved and become part of the formed resin composite article.

In general, the thickness of the separator film is minimally around 0.05 mil and may be as large as desired so long as the surface film is still sufficiently flexible and does not prevent the rolling or otherwise packaging of the resin composite layer or adhesive film Preferably, the separator film will be in the 0.1 to 1.0 mil thickness range.

The separator film may be applied to the resin composite as a film and then adhered through heat or pressure or a combination of heat and pressure. For example, a method of applying the separator film may include pressing the two layers together between a plurality of rollers and then rolling the adhered layers onto a spool.

The separator film may also be applied as a dispersion, allowing the desired separator film to remain on the resin composite material. For example, a dispersion consisting of colloidal particles of polyurethane suspended in water. This dispersion may be applied by spraying and coalescing using heat. Natural adhesion may also be used when applying the separator ply as a dispersion. Alternatively, heat, and/or pressure may be used. Additionally, any method of applying a separator film, as is known in industry, may be used. The separator film of the present invention may be applied to one or both sides of any pre-impregnated fiber-polymer composite material.

A method of making an article from a plurality of layers of a fiber reinforced resin composite material which has a degradable separator film applied to at least one side, typically includes forming a number of layers of the article from the composite material. Generally, the first layer of the article is cut or otherwise formed from a layer of the composite material. This first layer is then placed on a working surface. The working surface may be a lay-up tool or merely a flat working surface. The first layer is typically the bottom or base of a stack. A next layer of the article is then cut or formed from a layer of the composite material. This layer is then placed or stacked on top of the previous layer of the stack. This process of cutting or forming layers and stacking them is then repeated until the stack includes all of the desired layers of the article.

The stack or lay-up is then heated until the individual layers or plies are cured together and the separator film is generally degraded. This heating may take place in an autoclave, or in an oven. The heating may also be performed while confining the layers within a die or other mechanical restraining device. In a preferred method, the article is maintained in a vacuum bag while heating.

The heating may include a primary or secondary heating at a temperature at or above the ceiling or reversion temperature of the separator film, to ensure that the separator film has degraded or reverted as described above. Alternatively, the heating may merely be the heating required to cure the article, as described above.

As part of the method, the separator film, or at least a portion of the separator film may be removed from at least one of the resin composite layers prior to the step of stacking that layer. Even if the separator film is inadvertently left on the composite material, it will degrade and dissolve into the resin matrix.

As an alternative embodiment of the present invention, a composite sheet prepreg material layer which has a separator film to prevent the composite material from contacting itself when packaged is made by providing a given length of a composite sheet prepreg material. This length of prepreg material typically corresponds to the length to be placed on a roll such as a roll typically supplied in the industry. A separator film is applied to least one side of the composite sheet prepreg material. The separator film is adapted to generally degrade into a plurality of reversion product when subject to sufficient heat energy. The separator film may be a polymer, such as the compositions discussed above. Further, the separator film may be applied as described above.

The composite sheet material with the applied layer is then packaged such that the separator film acts to prevent the composite sheet prepreg material from contacting itself when packaged. This method is particularly useful for the packaging, handling, shipping and storage of the sheet prepreg material.

While this invention has been described with respect of various specific examples and embodiments, it is to be understood that the invention is not limited thereto and that it can be variously practiced within the scope of the following claims.

What is claimed is:

1. A prepreg composite material for use in forming a cured article, comprising:

a discrete layer of a fiber-reinforced resin composite material having a resin base; and a discrete polyurethane separator film applied to a side of said discrete composite material layer for providing a non-sticking surface on said composite material layer, said discrete separator film including no fibers, wherein said separator film is degradable at a ceiling temperature and said discrete layer of a fiber-reinforced resin composite material is substantially free of said separator film.

2. The composite material as recited in claim 1 wherein the ceiling temperature is between approximately 200 degrees Fahrenheit and approximately 400 degrees Fahrenheit.

3. The composite material as recited in claim 1 wherein the separator film degrades into a plurality of reversion products at the ceiling temperature and wherein at least one of the reversion products reacts with an epoxy moiety in said resin base to become part of the cured article.

4. The composite material as recited in claim 1 wherein the separator film degrades into a plurality of reversion products at the ceiling temperature and wherein at least one of the reversion products reacts with a polyamide in said resin base to become part of the cured article.

5. The composite material as recited in claim 1 wherein the polyurethane is formed by adding a glycol to a diisocyanate.

6. The composite material as recited in claim 1 wherein the separator film degrades into a glycol and a diisocyanate at the ceiling temperature.

7. The composite material as recited in claim 1 wherein the separator film degrades into an isocyanate at the ceiling temperature and wherein the isocyanate reacts with an amine present in the resin base to become a thermally stable part of the cured article.

8. An adhesive film comprising:

a thin discrete layer of a resin based adhesive; and a discrete polyurethane separator film applied to a side of said thin discrete layer of adhesive for providing a non-sticking surface on said discrete layer of adhesive, said discrete separator film including no fibers, wherein said discrete separator film is degradable at a ceiling temperature and said layer of a resin based adhesive is substantially free of said separator film.

9. An adhesive film as recited in claim 8 wherein the separator film degrades into a plurality of reversion products at the ceiling temperature and wherein at least one of the reversion products reacts with an epoxy moiety in said resin base to become part of the adhesive film.

10. An adhesive film as recited in claim 8 wherein the separator film degrades into a plurality of reversion products at the ceiling temperature and wherein at least one of the reversion products reacts with a polyamide in said resin base to become part of the adhesive film.

11. An adhesive film as recited in claim 8 wherein the ceiling temperature is between approximately 200 degrees Fahrenheit and approximately 400 degrees Fahrenheit.

* * * * *